United States Patent
Kaufmann et al.

(10) Patent No.: US 9,254,457 B2
(45) Date of Patent: Feb. 9, 2016

(54) AIR FILTER SYSTEM, AIR FILTER ELEMENT AND METHOD FOR EXCHANGING AN AIR FILTER ELEMENT

(71) Applicant: MANN+HUMMEL GMBH, Ludwigsburg (DE)

(72) Inventors: Michael Kaufmann, Meckenheim (DE); Klaus-Dieter Ruhland, Meckenheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 4 days.

(21) Appl. No.: 14/108,772

(22) Filed: Dec. 17, 2013

(65) Prior Publication Data

US 2014/0165834 A1   Jun. 19, 2014

(30) Foreign Application Priority Data

Dec. 17, 2012 (DE) .................. 10 2012 024 546

(51) Int. Cl.
| | | |
|---|---|---|
| *B01D 46/00* | (2006.01) | |
| *B01D 46/24* | (2006.01) | |
| *F02M 35/024* | (2006.01) | |
| *F02M 35/02* | (2006.01) | |

(52) U.S. Cl.
CPC ........ *B01D 46/0005* (2013.01); *B01D 46/2414* (2013.01); *F02M 35/0201* (2013.01); *F02M 35/02416* (2013.01); *F02M 35/02483* (2013.01); *B01D 2271/027* (2013.01); *B01D 2279/60* (2013.01)

(58) Field of Classification Search
CPC ........... B01D 46/0002; B01D 46/0004; B01D 46/0005; B01D 46/2411; B01D 46/2414; B01D 2201/291; B01D 2201/347; B01D 2271/027; B01D 2201/34; F02M 35/0201; F02M 35/02416; F02M 35/02483
See application file for complete search history.

(56) References Cited

U.S. PATENT DOCUMENTS

| | | | |
|---|---|---|---|
| 6,447,567 B1 * | 9/2002 | Ehrenberg ...................... 55/498 |
| RE42,174 E * | 3/2011 | Gunderson et al. ............. 55/498 |
| 8,864,866 B2 * | 10/2014 | Osendorf et al. ............... 55/502 |
| 2010/0263339 A1 | 10/2010 | Steins et al. | |
| 2014/0059986 A1 * | 3/2014 | Kaufmann et al. ............. 55/495 |

FOREIGN PATENT DOCUMENTS

| | | |
|---|---|---|
| DE | 202007018072 U1 | 12/2007 |
| DE | 202006014784 U1 | 2/2008 |
| DE | 102011106502 A1 | 12/2012 |

* cited by examiner

*Primary Examiner* — Robert Clemente
(74) *Attorney, Agent, or Firm* — James Hasselbeck

(57) ABSTRACT

An air filter system, in particular for the intake air of internal combustion engines, is provided. It comprises a housing with a housing upper part and a round air filter element for filtering air, the housing comprising a clean air connection for discharging clean air from the housing and an annular sealing groove axially opened towards the interior area of the housing surrounding the clean air connection for the engagement of an annular sealing web axially extending away from the filter element, the sealing groove featuring a cylindrical contact area to which a sealing surface of the sealing web can be applied in particular radially sealingly, wherein the sealing groove features a cylindrical support area facing the contact area and the support area features at least one extension protruding from the support area in the direction of the sealing surface, wherein the sealing web features a second surface opposite to the sealing surface that features several annularly surrounding indentations in radial direction, wherein the at least one extension engages respectively one of the indentations.

14 Claims, 3 Drawing Sheets

AIR FILTER SYSTEM, AIR FILTER ELEMENT AND METHOD FOR EXCHANGING AN AIR FILTER ELEMENT

CROSS REFERENCE TO RELATED APPLICATION

This application claims the benefit of foreign application DE 10 2012 024 546.7 filed in Germany on Dec. 17, 2012, and which is hereby incorporated by reference in its entirety.

TECHNICAL FIELD

The present invention relates to a filter system comprising a filter housing and filter element, which can be used for filtering air as well as a filter element and its use for such a filter system. The invention relates in particular to an air filter system as well as an air filter element and its use for such an air filter system, in particular for the intake air of internal combustion engines.

Filter elements are used for the filtration of fluid flows or gaseous media. They are, for example, used for the filtration of an air flow which is directed into an internal combustion engine. It is necessary to eliminate suspended particles from the internal combustion engine. Such air filters, for example for trucks, construction machines, agricultural machines or even marine engines have to be designed in a reliable and robust manner, for they can be exposed to extreme mechanical loads during operation.

Normally, filters have a housing with a housing upper part, wherein an exchangeable filter element can be installed into the housing. Normally, the filter element has a tubular design and is frictionally engaged in the housing by means of a seal.

BACKGROUND OF THE INVENTION

U.S. Pat. No. 6,599,342 B2 discloses a filter assembly in which a filter holder features at least one through hole which serves to sealingly accommodate a filter element with an adapter collar.

For example foam made of polyurethanes (PU), also called PU foam, is used as seal between housing or housing cover and filter element. Such foam made of polyurethanes, however, relaxes after heat storage (artificial storage) or high temperature effect or temperature change.

In other words, the foam made of polyurethanes is force-free after heat storage. With filter elements relying upon frictional engagement in the housing, this relaxation of the PU foam is often the reason why greater critical movements between the individual parts occur with vibration excitation of the assembly from the parts housing with housing upper part, seal, and filter element. Such a vibration excitation can, for example, occur during the operation of a motor vehicle into which the filter is installed. In this case, in particular a rotating movement of the filter element may occur during operation so that the sealing compounds are heavily stressed and particles may penetrate.

SUMMARY OF THE INVENTION

An object of the invention is to develop an improved air filter system and an improved air filter element.

Accordingly, the air filter system serves in particular for the intake air of internal combustion engines and includes a housing and at least one air filter element for filtering air. The housing includes preferably a housing upper part with in particular a central clean air connection for discharging clean air cleaned in the air filter element from the housing and a sealing area preferably designed as sealing groove for an in particular form-fitting connection with a cylindrical, in particular radially acting seal of the air filter element and for holding the air filter element.

The sealing area features preferably a cylindrical, from the housing upper part into the interior space of the housing extending contact area, which encloses or surrounds the clean air connection. The seal of the air filter element can radially sealingly contact this area with a sealing surface. In this case, the contact area can also be axially offset in relation to the clean air connection.

In one embodiment, the sealing groove is a sealing groove axially opened towards the interior space of the housing surrounding the clean air connection. It serves for the engagement of an annular sealing web axially extending from the filter element, wherein the sealing groove features a cylindrical contact area to which a sealing surface of the sealing web can be applied in particular radially sealingly. Furthermore, the sealing groove features a support area preferably facing the contact area, which features at least one extension protruding from the support area in the direction of the sealing surface. Even furthermore, the sealing web features a second surface opposite to the sealing surface that features several annularly surrounding indentations in radial direction, wherein the at least one extension engages respectively one of the indentations.

Extension and indentations are preferably correspondingly designed in such a way that the indentation encloses the extension in a form-fitting manner.

In this way, the position of the filter element in compact design can be secured without any additional parts in such a way that a rotation of the filter element during operation is avoided. As these means are disposed at the housing upper part in the area of the clean air connection, it is possible, even in the case of a rotationally fixed filter element, to turn advantageously the cover when it is already fitted but not yet completely fixed. As a result, it is easier for the operator to adjust the cover independently in its position after a filter element change. This is of particular advantage when a dust discharge opening disposed in the cover has to be adjusted perpendicularly towards the bottom in the direction of gravity in order to ensure a reliable dust discharge.

In one embodiment, the contact area of the sealing groove is cylindrical and, for example, disposed radially outside of or inside in the sealing groove. The support area has preferably also a cylindrical or conical design, for example with a diameter that increases in the direction of the housing interior area. A cylindrical shape can optimize a radial supporting effect for supporting the radial sealing effect; a conical shape can reduce the operating forces that occur during filter change.

The extension(s) at the support area can, for example, feature the shape of a cylinder section, the central axis of which extends outside of the support area and substantially parallel in relation to the central axis of the housing. As an alternative, the shape of rounded triangular prisms extending substantially parallel in relation to the central axis of the housing is also conceivable.

An air filter element for a detachable installation into a housing of an air filter system according to the invention includes preferably an annular sealing web extending axially from the filter element, which is designed in such a way that it can engage in the housing-sided sealing groove with a contact area and a support area opposing it. In this case, the sealing web features preferably a sealing surface that can be radially sealingly applied to the contact area of the sealing groove and furthermore a second surface opposing the sealing surface with several annularly surrounding indentations spaced apart from each other. In this case, the indentations are preferably designed in such a way that they can enclose an extension protruding from the support area of the sealing groove in the direction of the contact area in particular in a form-fitting manner, when the air filter element is installed in the housing.

The second surface of the sealing web is preferably adapted in such a way that it can be radially supported at the support area.

In one preferred embodiment, the indentations are regularly spaced apart from each other in the second surface. In this way, the air filter element can be installed in all those positions in the housing in which one of the indentations corresponds with the extension or the extensions. In this case are preferably provided a plurality of indentations, preferably 10 or more, so that the filter element can be installed in 10 or more rotational positions. When inserting the filter element, a correct position can thus be found by means of a slight rotating movement.

In one embodiment, the indentations and/or the extension/the extensions have substantially the shape of a cylinder section, the central axis of which extends radially outside of the sealing web or the support area and substantially parallel in relation to the central axis of the filter element or the housing. In case the support area or the second surface has a conical design, the central axes of extensions or indentations extend preferably substantially parallel in relation to the outside surface of the conical support area or second surface.

In one embodiment, the indentations and/or the extension/the extensions have substantially the shape of rounded, substantially parallel in relation to the central axis of the air filter element extending triangular or polygonal prisms, the extension direction (displacement direction) of which extends substantially parallel in relation to the central axis of the filter element or the housing. In case the support area or the second surface has a conical design, the extension directions (displacement directions) of extensions or indentations correspondingly extend preferably substantially parallel in relation to the outside surface of the prisms. The triangular basic shape can change into a round shape as described above by means of strong rounding of the peaks and the transition areas in relation to the support area.

The cylindrical shape of the sealing surface can preferably be designed as round cylinder, in particular as circular cylinder, elliptic cylinder or oval cylinder. In this case, the shape preferably forms the outer circumference of the air filter element. However, a polygonal, in particular rectangular shape can be chosen.

The air filter element is preferably designed as round filter element, which includes a zigzag folded, closed annular filter bellows that encloses a central interior space. The filter bellows is sealed at its axial ends by end disks, wherein one end disk features a central annular inlet or outlet opening at which the seal for separating raw from clean side is disposed. However, the air filter element can also feature two zigzag folded, annularly closed filter bellows which are arranged one inside the other and connected with each other in such a way that one filter bellows can be radially flowed through from the outside to the inside and the other filter bellows can be radially flowed through from the inside to the outside. An air filter element with channels extending in flow direction is also conceivable which are formed by the fact that one smooth filter media layer and one undulated filter media layer are alternately placed on top of each other and that the channels formed therebetween are alternately closed.

As filter medium, a flat, porous filter medium can be used in each case, for example individual layers or combinations of cellulose media, glass fiber media, fleeces made of meltblown or spun synthetic fibers.

In one embodiment, the sealing groove is formed by a recess or groove in the housing annularly enclosing the clean air connection, in particular in the housing upper part.

In one embodiment, the sealing surface is formed by a cylindrical, radial inner or outer wall of the recess or groove.

Preferably, a radially outwardly extending contact area, in particular for the air filter element, is provided at the housing.

Preferably, the filter element is axially supported in the housing in the area of its closed bottom end disk by the cover and held in position.

Preferably, an air permeable central tube for radially supporting the exchangeable filter element is disposed in the housing and preferably connected undetachably with the housing, for example in the area of the clean air connection. The central tube is radially disposed in the filter element in order to stabilize it radially from the outside to the inside when it is flowed through.

The invention relates furthermore to an air filter element for a detachable installation into a housing of an air filter system in particular according to the invention, wherein the air filter element includes a seal for holding the air filter element at the housing and for sealing a space between the air filter element and the housing upper part when the air filter element is detachably installed in the housing, wherein the seal can be connected with the sealing groove of the housing upper part in a form-fitting manner.

The form fit is preferably realized in radial direction, i.e. one part of the one component, preferably of the housing, for example the extension, engages radially into the other part, preferably the air filter element. A form-fitting connection is thereby realized which makes a rotational movement of the filter element in the seal seat difficult.

The filter element is preferably an air filter element, for example for filtering combustion air of an internal combustion engine. However, the invention can also be used for all liquid filters, for example oil filters or fuel filters.

The seal is preferably made at least partially or completely of a casting compound, for example of an in particular foamed PUR material. In particular the seal and/or the materials of the filter element or the housing are designed for operating temperatures between 30° C. and 90° C. The seal is preferably made of the same material in one piece with an end disk. Further preferably, the end disk is made of the casting compound and sealingly connected with the filter bellows during casting.

Furthermore, the seal can feature at least one stiffening element for stiffening the seal.

The sealing web of the mentioned air filter elements can, for example, extend axially away either from an end face of a filter medium construction, for example the end face of an annularly closed, star-shaped folded filter medium bellows, or from an end disk construction disposed there. However, the sealing web can also be formed by an end disk construction closing a frontal axial end of an annularly closed star-shaped folded filter medium bellows. In this way, sealing surface and second surface can either be disposed axially outside of the area of the filter medium or in an area which still surrounds the filter medium at least partially.

With the seals according to the invention, the second surface of the sealing web is meant to generate a contact pressure to the in particular radially inside disposed sealing surface when the filter element is being mounted or is mounted in the housing. This second surface of the sealing web is thereby preferably radially supported at, for example, the annular support area of the sealing groove. The indentations which are not in engagement with an extension reduce the pressure or mechanical resistance which is perceivable when mounting the filter element. It is, therefore, preferable that a smaller number of extensions is provided at the support area than indentations at the filter element. Particularly preferred, only one extension is provided.

The invention relates furthermore to a method for exchanging an air filter element in an air filter system according to the invention in which the housing is opened, in particular by loosening a housing lower part from the housing upper part, subsequently an air filter element in particular according to the invention is removed from the housing and further subsequently an air filter element in particular according to the invention is mounted into the housing in such a way that the sealing web is connected with the sealing groove of the housing upper part in a form-fitting manner.

During installation, the seal of the filter element is applied and, in case an indentation does not yet correspond with the extension, slightly turned until it can be completely inserted into the sealing groove. During insertion, the sealing surface of the sealing web radially sealingly abuts the corresponding contact area of the housing.

Further possible implementations of the invention comprise also not explicitly mentioned combinations of characteristics or embodiments described previously or in the following with respect to the examples of an embodiment. In this context, the person of skill in the art will add also individual aspects as improvements or complements to the respective basic form of the invention.

Further embodiments of the invention are subject of the subclaims as well as of the examples of an embodiment of the invention described in the following. Furthermore, the invention is explained in detail based on examples of an embodiment with reference to the attached figures.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
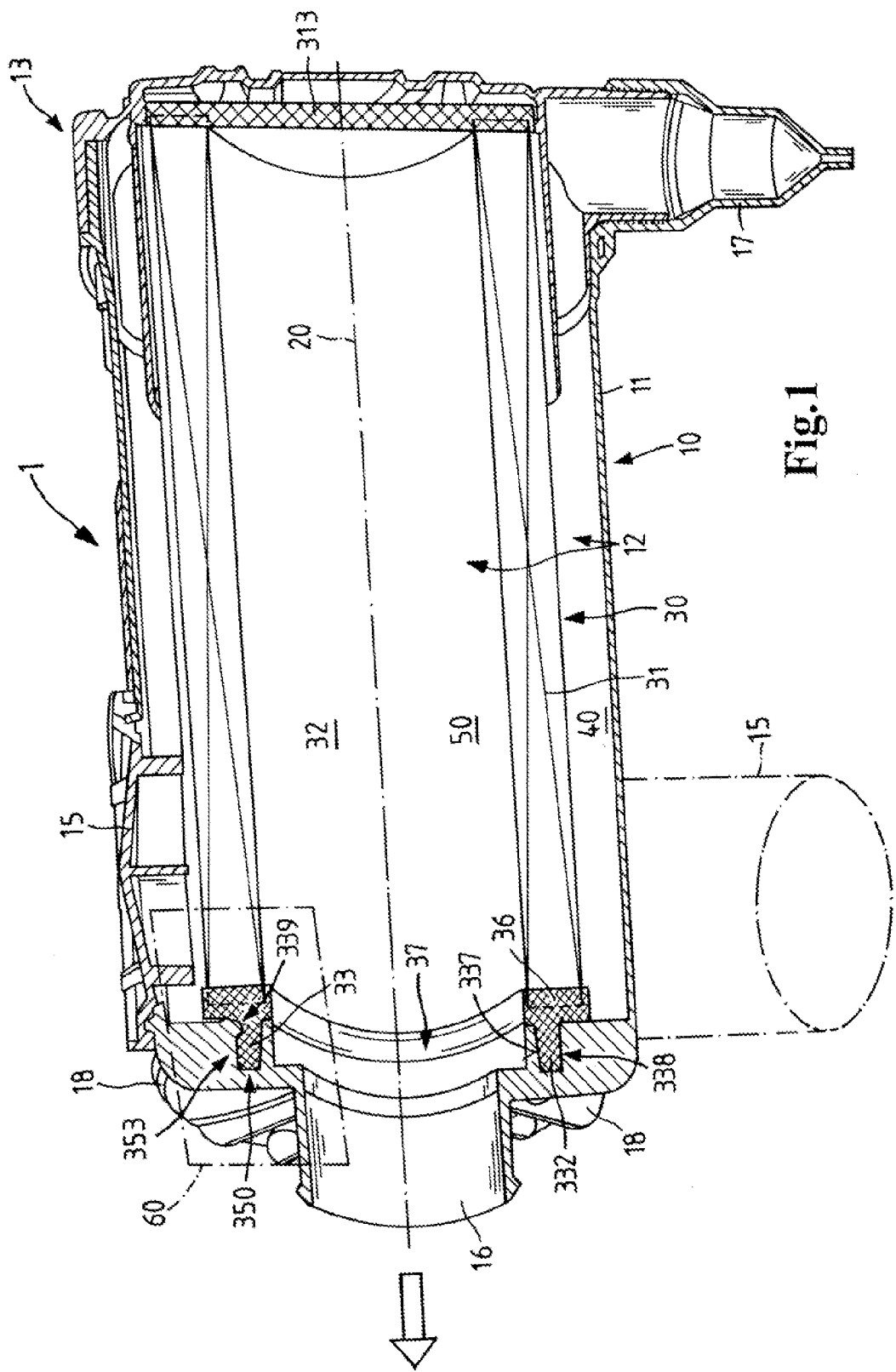
FIG. 1 is a three-dimensional sectioned view of an air filter according to a first example of an embodiment.

In the figures, the same reference numerals denote identical or analog components, unless otherwise stated. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

In the following, the invention is described by means of a filter for the combustion air of an internal combustion engine such as, for example, for a motor vehicle. Instead of filtering air, suitable filter elements can be designed, for example, for filtering another gaseous or liquid medium such as, for example, oil.

Figure 2:
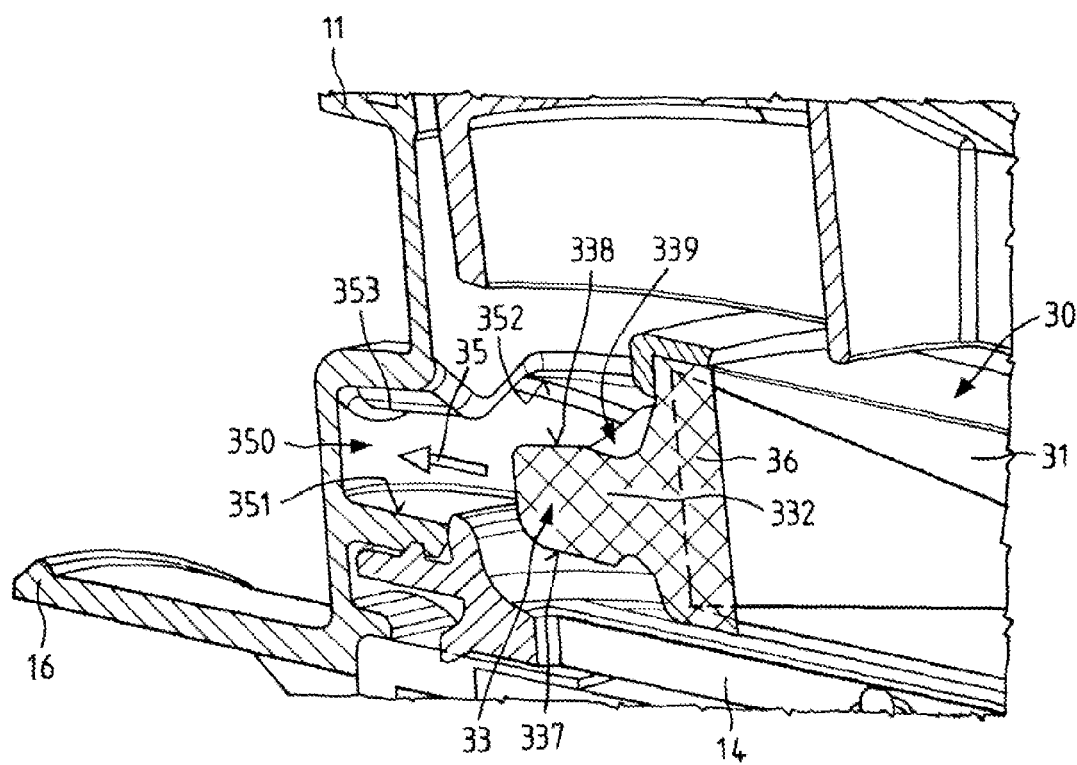
FIG. 2 is a detail view of a variant of the air filter of FIG. 1.

The embodiments shown in the figures serve in particular for the filtration of intake air of internal combustion engines and comprise a housing and at least one air filter element for filtering air. As shown in FIGS. 1 and 2, the filter 1 comprises according to the first example of an embodiment a housing 10 with a housing upper part 11 which is connected with a housing lower part 13 (cover). In this case, FIG. 2 shows a variant in detail of the section identified by 60 in FIG. 1. The housing 10 in FIG. 1 is thus a two-part housing 10. The housing lower part 13 is, for example, held by means of clamps at the housing upper part 11. At the housing upper part 11 is disposed a raw air connection 15 with which raw air, unfiltered air, can be introduced into the housing 10. In the shown sectional view, the area with the inflow opening is cut off and therefore not visible. A raw air connection with radial or tangential inflow can be realized. At the housing upper part 11 is also disposed a clean air connection 16 with which clean air, air cleaned from impurities, can be discharged from the housing 10 in the flow direction shown by the white block arrow. At the housing lower part 13 is disposed a discharge valve 17 with which particles, that were contained in the raw air, can be discharged from the housing 10. However, active extractions can also be provided. The housing 10 has several ribs 18 at the housing upper part 11 and the housing lower part 13 which are, for example, meant to stiffen the housing 10 or the housing upper part 11 or the housing lower part 13. To provide a clear overview, not all ribs 18 in FIG. 1 are provided with a reference numeral. A filter element 30 for filtering air is installed in the housing 10. In the housing 10 is disposed a central tube 14 which has a hollow-cylindrical and grid-shaped design so that it can be radially flowed through by air filtered by the filter element 30. The central tube 14 is preferably attached at an axial end in the housing 10 in the area of the clean air connection 16, for example, as shown in FIGS. 1 and 2, by means of a snap-in connection which is preferably undetachable or nondestructively detachable. When installed, the filter element 30 surrounds the central tube 14. When in operation, the central tube 14 can radially support the filter element 30 and prevent a collapse in case the differential pressure at the filter element 30 is too high.

The housing 10 comprises preferably a sealing area designed as sealing groove 350 for an in particular form-fitting connection with a cylindrical, in particular radially acting seal 33 of the air filter element 30 and for holding the air filter element 30. The sealing area 350 features preferably a cylindrical, from the housing upper part into the interior space of the housing extending contact area 351 (FIG. 2) which encloses the clean air connection 16. The seal 33 of the air filter element 30 can radially sealingly contact this area with a sealing surface 337. As shown in the FIGS. 1 and 2, the contact area can also be axially offset in relation to the clean air connection.

In the embodiment shown, the sealing groove 350 is an axial sealing groove axially opened towards the interior space of the housing surrounding the clean air connection. It serves for the engagement of an annular sealing web 332 axially extending from the filter element, wherein the sealing groove 350 features radially inside the cylindrical contact area 351 to which the sealing surface 337 of the sealing web can be applied radially sealingly. Furthermore, the sealing groove features a radially outside disposed support area 352 facing the contact area which features at least one extension 353 protruding from the support area 352 in the direction of the contact area 351. The sealing web features particularly preferred a second surface 338 opposite to the sealing surface 337 that features several annularly surrounding indentations 339 in radial direction, wherein the at least one extension can engage respectively one of the indentations when the filter element has reached in mounting direction 35 its axial end position in the housing 10. Extension 353 and indentations 339 are preferably correspondingly designed in such a way that the indentation encloses the extension in a form-fitting manner. In this case, the indentations 339 preferably form the shape of the extension 353, in the case of a resilient sealing compound for the seal 33, for example of polyurethane, the indentations 339 can be designed with a slight oversize in such a way that they are slightly presses by the housing-sided extension 353 during installation. In this way, the position of the filter element 30 in compact design can be secured without any additional parts in such a way that a rotation of the filter element 30 during operation is avoided. As these means serving to prevent a rotation are disposed at the housing upper part 11 in the area of the clean air connection, it is possible, even in the case of a rotationally fixed filter element 30, to turn advantageously the housing cover 13 when it is already fitted but not yet completely fixed. As a result, it is easier for the operator to adjust the cover 13 independently in its position after a filter element change. This is of particular advantage when a dust discharge opening 17 disposed in the cover has to be adjusted perpendicularly towards the bottom in the direction of gravity in order to ensure a reliable dust discharge.

As shown in FIG. 2, the contact area 351 of the sealing groove 350 is preferably cylindrical and disposed radially inside in the sealing groove. The support area 352 has also a cylindrical and preferably a slightly conical design, with a diameter that increases in the direction of the housing interior area 12. The conical shape can reduce the operating forces occurring when exchanging the filter.

As shown, the extension 353 at the support area 352 is, for example, designed in the shape of a rounded, substantially in relation to the central axis 20 of the housing 10 or the contact area 351 parallel extending triangular prism. The peak extending into the sealing groove 350 as well as the transitions in the support area 352 are rounded. FIG. 2 makes clear that the triangular basic shape can change into a round shape of a cylinder section by means of strong roundings of the peaks and the transition areas towards the support area 352.

Figure 3:
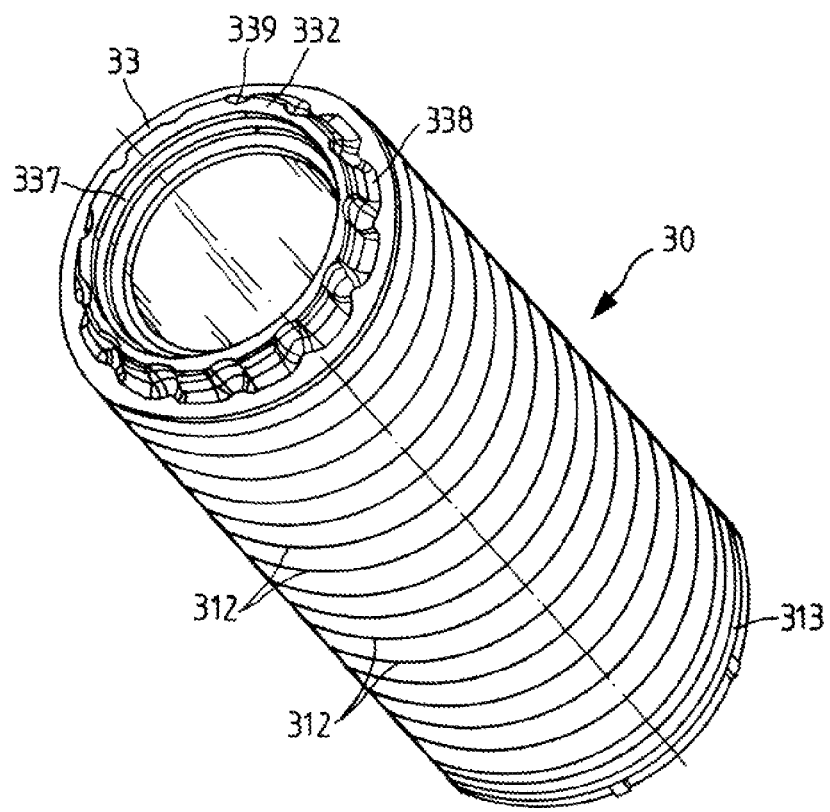
FIG. 3 is a three-dimensional detail view of the filter element according to a first example of an embodiment.

The air filter element 30 for a detachable installation into the housing 10 of the shown filter 1 comprises an annular sealing web 332 extending axially from the filter element which is designed in such a way that it can engage in the housing-sided sealing groove 350 with the contact area 351 and the support area 352 opposing it. In this case, the sealing web 33 features preferably, as shown in FIG. 24, a sealing surface 337 that can be radially sealingly applied to the contact area 351 of the sealing groove 350 and furthermore a second surface 338 opposing the sealing surface with several annularly surrounding indentations 339 spaced apart from each other. In this case, the indentations are preferably, and as shown, designed in such a way that they can enclose an extension 353 protruding from the support area 352 of the sealing groove 350 in the direction of the contact area 351 in particular in a form-fitting manner, when the air filter element 30 is installed in the housing 10. The second surface 338 of the sealing web 332 is in this case, as shown, preferably adapted in such a way that it can be radially supported at the support area 352. As shown, the indentations 339 are preferably regularly spaced apart from each other in the second surface 338. In this way, the air filter element 30 can be installed in all those positions in the housing 10 in which one of the indentations 339 corresponds with the extension 353. In this case are preferably provided a plurality of indentations, preferably 10 or more, for example 13 pieces, as shown in FIG. 3. In this way, the filter element can be installed in 10 or more rotational positions. When inserting the filter element 30 in mounting direction 35, a correct position can thus be found by means of a slight rotating movement.

As indicated in FIG. 24, the indentations 339 and/or the extension 353 have substantially the shape of rounded, substantially parallel in relation to the central axis of the air filter element extending triangular or polygonal prisms, the extension direction (displacement direction) of which extends substantially parallel in relation to the central axis 20 of the filter element 30 or the housing 10. In case the support area 352 or the second surface 338 has a conical design, the extension directions (displacement directions) of extensions or indentations correspondingly extend preferably substantially parallel in relation to the outside surface of the prisms.

As an alternative, the indentations 339 and/or the extension 353 can substantially have the shape of a cylinder section, the central axis of which extends radially outside of the sealing web 332 or the support area 352 and substantially parallel in relation to the central axis 20 of the filter element 30 or the housing 10. In case the support area 352 or the second surface 338 has a conical design, the central axes of extensions or indentations extend preferably substantially parallel in relation to the outside surface of the conical second surface or support area.

The cylindrical shape of the sealing surface 337 can preferably be designed as round cylinder, in particular as circular cylinder, elliptic cylinder or oval cylinder. In this case, the shape preferably forms the outer or inner circumference of the air filter element, for example with a radial distance from the circumference, as shown in FIG. 24. However, a polygonal, in particular rectangular shape can be chosen.

The air filter element 30 is preferably designed and shown in all figures as round filter element which comprises a zigzag folded, closed annular filter bellows 31 that encloses a central interior space 32. The filter bellows 31 is sealed at its axial ends 36, 313 by end disks, wherein the open end disk 36 features a central annular outlet opening 37 at which the seal 33 for separating raw 40 from clean side 50 is disposed. As filter medium for the filter bellows 31, a flat, porous filter medium can be used in each case, for example individual layers or combinations of cellulose media, glass fiber media, fleeces made of meltblown or spun synthetic fibers.

The air filter element 30 for a detachable installation into the housing 10 of the air filter system is preferably held at the open end disk 36 by means of the seal 33 at the housing and is thus sealing in the housing the raw side 40 from the clean side 50, wherein the seal 33 is connectable with the sealing web 332 with the sealing groove 350 of the housing upper part 11 in a form-fitting manner.

The form fit is preferably realized in radial direction, i.e. one part of the one component, preferably of the housing, engages radially into the other part, preferably the filter element, for example the extension 353 engages, as shown in FIG. 12, in one of the indentations 339 which, as a result, encloses the extension. A form-fitting connection is thereby realized which makes a rotational movement of the filter element in the seal seat difficult.

The end disks 38, 313 are preferably made at least partially or completely of a casting compound, for example of an in particular foamed PUR material. The seal 33 or the sealing web 332 is in particular made in one piece and of the same material with the open end disk 36.

With the seals 33 shown in the figures, the second surface 338 of the sealing web 332 is meant to generate a contact pressure to the in particular radially inside disposed sealing surface 337 when the filter element 30 is being mounted or is mounted in the housing 10. The second surface 338 of the sealing web 332 is thereby preferably radially supported at the support area 352 of the sealing groove 350. The indentations 339, which are not in engagement with an extension, reduce the pressure or mechanical resistance which is perceivable when mounting the filter element. It is, therefore, preferable that a smaller number of extensions is provided at the support area than indentations at the filter element. Particularly preferred, only one extension is provided, as shown in the figures.

For exchanging an air filter element 30 in an air filter system 1, the housing 10 is opened, in particular by loosening a housing lower part or a cover 13 from the housing upper part 11, subsequently an air filter element 30 is removed from the housing and further subsequently a new air filter element 30 is mounted into the housing 10 in such a way that the sealing web 332 is connected with the sealing groove 350 of the housing upper part in a form-fitting manner. In this case, the seal 33 of the filter element 30 is applied and, in case an indentation 339 does not yet correspond with the extension 350, slightly turned until it can be completely inserted into the sealing groove 350. During insertion, the sealing surface 337 of the sealing web 332 radially sealingly abuts the corresponding contact area 351 of the housing 10.

Figure 4:
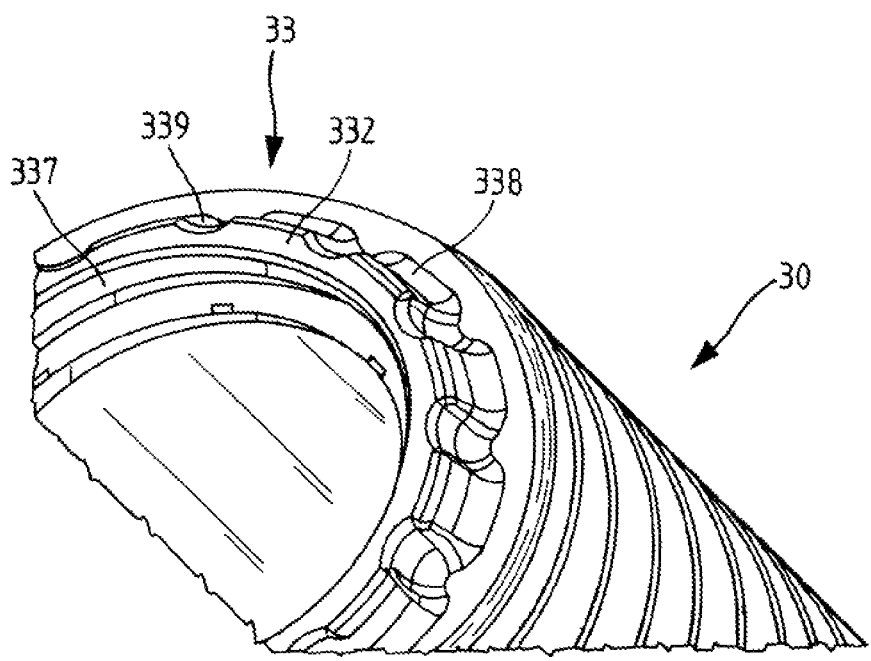
FIG. 4 is a detail view of a filter element according to a second example of an embodiment.

FIG. 3 shows a filter element 30 for use in an air filter system according to the invention according to an example of an embodiment in a three-dimensional overall view. The filter element 30 in FIG. 3 is a hollow-cylindrical body which features at its external circumference several adhesive threads 312 for stabilizing the folds which, for the sake of clarity, do not all have a reference numeral in FIG. 3. At the bottom in FIG. 3, the filter element 30 is completed by a bottom end disk 313. The seal 33 is disposed at the end of the filter element 30 opposing the bottom end disk 313. The seal 33 has a sealing web 332 with a radially acting sealing surface 337 on the interior side and a second surface 338 of the sealing web 332. The seal 33 features at the second surface 338 a plurality of indentations 339 which, for the sake of clarity, do not all have a reference numeral. The indentations 339 are disposed side by side along the circumference of the sealing web 332. FIG. 4 shows the shape of the seal 33 with the indentations 339 in enlarged detail.

The sealing exterior side 338 of the seal 33 is preferably meant to generate a contact pressure to the sealing surface when the filter element 30 is being installed in mounting direction 35 or installed in the housing 10. The indentations 339 reduce the pressure or mechanical resistance which is perceivable when mounting the filter element and are meant to realize a form-fit enclosure of a housing-sided extension.

All examples of an embodiment of the filter 1, the filter element 30 and the housing 10 described above can be used individually or in all possible combinations. In this connection, the following modifications are in particular conceivable.

Other geometries and dimensions for the filter element 30 as those depicted and described can be chosen insofar as the conditions at the installation site of the filter element 30 have to be taken into account and a detachable, haptically perceivable installation of the filter element 30 in the housing 10 is possible.

As material for the seal 33, an adhesive film that hardens and/or swells due to the heat impact can also be used instead of polyurethane. The number of indentations 339 at the seal 33 can be chosen as appropriate.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. An air filter system for the intake air of internal combustion engines, comprising:
   a round air filter element including
      a filter media;
      a radially acting annular seal disposed at an axial end of the filter element;
   a housing including
      a housing upper part;
      a clean air connection for discharging clean air from the housing;
      wherein the housing includes an annular accommodating area axially opened towards an interior space of the housing surrounding the clean air connection and engaging the radially acting annular seal of the filter element;
      a cylindrically extending sealing surface extending from the upper housing part;
   a sealing area including a cylindrical contact area to which the sealing surface of the seal abuts and contacts radially, forming a radial seal;
   an accommodating area including a support area facing the cylindrical contact area;
   at least one extension protruding from the support area in the direction of the contact area;
   wherein the radially acting annular seal includes a second surface arranged opposite to the sealing surface that includes several annularly surrounding indentations in radial direction;
   wherein each of the at least one extension engages with a respective one of the indentations.

2. The air filter system according to claim 1, wherein the accommodating area is designed as sealing groove or the seal is configured as a sealing web.

3. The air filter system according to claim 1, wherein the contact area is disposed cylindrically radially outside of the sealing groove or arranged inside within the sealing groove.

4. The air filter system according to claim 1, wherein the contact area has a cylindrical contact area.

5. The air filter system according to claim 1, wherein the support area has a cylindrical or conical design with a diameter that increases in the direction of the housing interior area.

6. The air filter system according to claim 1, wherein the second surface of the sealing web is radially supported at the support area.

7. The air filter system according to claim 1, wherein the at least one extension are configured with a cylindrical shape, a central axis of the cylindrical shape extending outside of the support area and substantially parallel in relation to a central axis of the housing.

8. The air filter system according to claim 1, wherein the extensions have a rounded triangular prism shape and extend substantially parallel in relation to a central axis of the housing.

9. An air filter element for detachable installation into the housing of an air filter system according to claim 1, the air filter element comprising:
   an annular sealing web axially extending from the filter element for engaging into a housing-sided sealing groove with a contact area and a support area opposing it;
   wherein the annular sealing web is a T-shaped sealing web having a T-shaped cross section, the annular sealing web having:
      a radially extending annular base portion corresponding to a top of the T secured onto the filter media at an axial end of the filter media; and
      an axially projecting portion arranged on and projecting axially outwardly away from the annular base portion, the axially projecting portion including:
         a sealing surface configured and operable to seal radially with the contact area of the sealing groove;
         a second surface opposing the sealing surface with several annularly surrounding indentations spaced apart from each other; the indentations extending axially on the second surface from a free axial end face of the axially projecting portion towards the annular base portion of the annular sealing web;
      wherein the several annularly surrounding indentations are operable to receive an extension protruding from the support area of the sealing groove in the direction of the contact area such that the several annularly surrounding indentations can be enclosed in a form-fitting manner.

10. The air filter element according to claim 9, wherein the second surface of the sealing web is configured to be radially supported on the support area.

11. The air filter element according to claim 9, wherein the indentations are regularly spaced apart from each other in the second surface.

12. The air filter element according to claim 9, wherein the indentations have substantially the shape of a cylinder section, the cylinder section having a central axis which is outside of the sealing web and substantially parallel in relation to a central axis of the filter element.

13. The air filter element according to claim 9, wherein the extensions have the shape of rounded triangular prisms extending substantially parallel in relation to the central axis of the air filter element.

14. The air filter element according to claim 9, wherein the indentations extend axially on the second surface from a free axial end face of the axially projecting portion to the annular base portion of the annular sealing web.

\* \* \* \* \*